(12) United States Patent
Huang

(10) Patent No.: US 10,046,954 B1
(45) Date of Patent: Aug. 14, 2018

(54) SUSPENSION TYPE LIFTING DEVICE WITH STEERING MECHANISM

(71) Applicant: Chuan-Shan Huang, Changhua (TW)

(72) Inventor: Chuan-Shan Huang, Changhua (TW)

( * ) Notice: Subject to any disclaimer, the term of this patent is extended or adjusted under 35 U.S.C. 154(b) by 0 days.

(21) Appl. No.: 15/725,311

(22) Filed: Oct. 5, 2017

(51) Int. Cl.
| | | |
|---|---|---|
| *B66C 13/08* | (2006.01) | |
| *F16H 1/22* | (2006.01) | |
| *B66C 1/22* | (2006.01) | |

(52) U.S. Cl.
CPC ............... *B66C 13/08* (2013.01); *B66C 1/22* (2013.01); *F16H 1/222* (2013.01)

(58) Field of Classification Search
CPC .... B66C 1/22; B66C 1/18; B66C 1/16; B66C 1/24; B66C 1/62; B66C 1/34; B66C 1/12; B66C 19/002; B66C 13/00; B66C 13/04; B66C 13/40; B66C 17/00; B66C 13/08; B66F 3/00; G02B 6/4464; F16H 1/222
See application file for complete search history.

(56) References Cited

U.S. PATENT DOCUMENTS

| | | | | |
|---|---|---|---|---|
| 5,052,734 A | * | 10/1991 | Hasegawa ............... | B66C 1/663 294/81.2 |
| 7,222,902 B2 | * | 5/2007 | Slezak ..................... | B66C 1/24 294/67.22 |
| 8,424,938 B1 | * | 4/2013 | Li ............................ | B66C 1/12 294/67.5 |
| 2010/0176613 A1 | * | 7/2010 | Huecker .................. | B66C 1/10 294/67.5 |
| 2013/0147218 A1 | * | 6/2013 | Steffensen .............. | B66F 11/00 294/67.5 |

* cited by examiner

*Primary Examiner* — Stephen A Vu
(74) *Attorney, Agent, or Firm* — Alan D. Kamrath; Kamrath IP Lawfirm, P.A.

(57) ABSTRACT

A suspension type lifting device includes a base unit, a balance unit, two servo units, a hanging unit and a steering unit. The steering unit is mounted in the base unit and includes a housing having a receiving chamber, a control module mounted on the housing, and at least one gyroscope rotatably mounted in the receiving chamber of the housing and electrically connected with the control module. When the at least one gyroscope performs the self-rotation and the side-rotation simultaneously, the side-rotation produces a torque to change a direction of the self-rotation and to produce a precession, so as to change the direction of the lifting device.

10 Claims, 10 Drawing Sheets

SUSPENSION TYPE LIFTING DEVICE WITH STEERING MECHANISM

BACKGROUND OF THE INVENTION

1. Field of the Invention

The present invention relates to a mechanic device and, more particularly, to a suspension type lifting device with a steering mechanism.

2. Description of the Related Art

A conventional suspension type lifting device in accordance with the prior art shown in FIG. 10 comprises a base unit 6, a bearing unit 7, a balance unit 8, a servo unit 9 and a hanging unit 10. The base unit 6 includes a first plate 61, a second plate 62 mounted on the bottom of the first plate 61, and a third plate 63 connected with the second plate 62. The bearing unit 7 includes a positioning piece 71 located at the front end of the second plate 62 and two forks 72 connected with the positioning piece 71. The balance unit 8 is connected with the third plate 63 of the base unit 6. The servo unit 9 is mounted on the first plate 61 of the base unit 6. The hanging unit 10 is mounted on the first plate 61 of the base unit 6. In operation, when the servo unit 9 detects that the cargo is placed on the bearing unit 7, the servo unit 9 calculates the required balance weight and transmits a command so that an external counterweight is applied on the balance unit 8, to maintain a balance state during transportation. However, when the lifting device is turned, the operator has to apply an external force on the lifting device to change the direction of the lifting device, thereby causing inconvenience and danger to the operator.

BRIEF SUMMARY OF THE INVENTION

The primary objective of the present invention is to provide a suspension type lifting device having a steering function.

In accordance with the present invention, there is provided a suspension type lifting device comprising a base unit, a balance unit mounted on the base unit, two servo units mounted on the base unit, a hanging unit mounted on the base unit, and a steering unit mounted on the base unit. The base unit includes two support boards, with a mounting space being defined between the two support boards. The balance unit includes two weight bars each of which has an end mounted in the mounting space of the base unit. The two servo units are connected with the two weight bars of the balance unit respectively. The hanging unit includes a stand secured on the base unit and a hanging member movably mounted on the stand and having an upper end provided with a hanging hole. The steering unit is mounted in the mounting space of the base unit and includes a housing secured in the mounting space of the base unit and having an interior provided with a receiving chamber, a control module mounted on the housing for receiving a control signal and providing an electric power, and at least one gyroscope rotatably mounted in the receiving chamber of the housing and electrically connected with the control module. The receiving chamber of the housing has a front side and a rear side each provided with a mounting zone. The at least one gyroscope has a front end and a rear end each provided with a fitting member mounted in the respective mounting zone of the housing. The at least one gyroscope performs a self-rotation by the control module and performs a side-rotation by the fitting member. When the at least one gyroscope performs the self-rotation and the side-rotation simultaneously, the side-rotation produces a torque to change a direction of the self-rotation and to produce a precession, so as to change a direction of the lifting device.

According to the primary advantage of the present invention, the at least one gyroscope controls the turning direction and stabilizes the center of gravity of the lifting device, so that the lifting device has a steering function by rotation of the at least one gyroscope, without needing aid of an external force, thereby facilitating the lifting device changing its direction.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
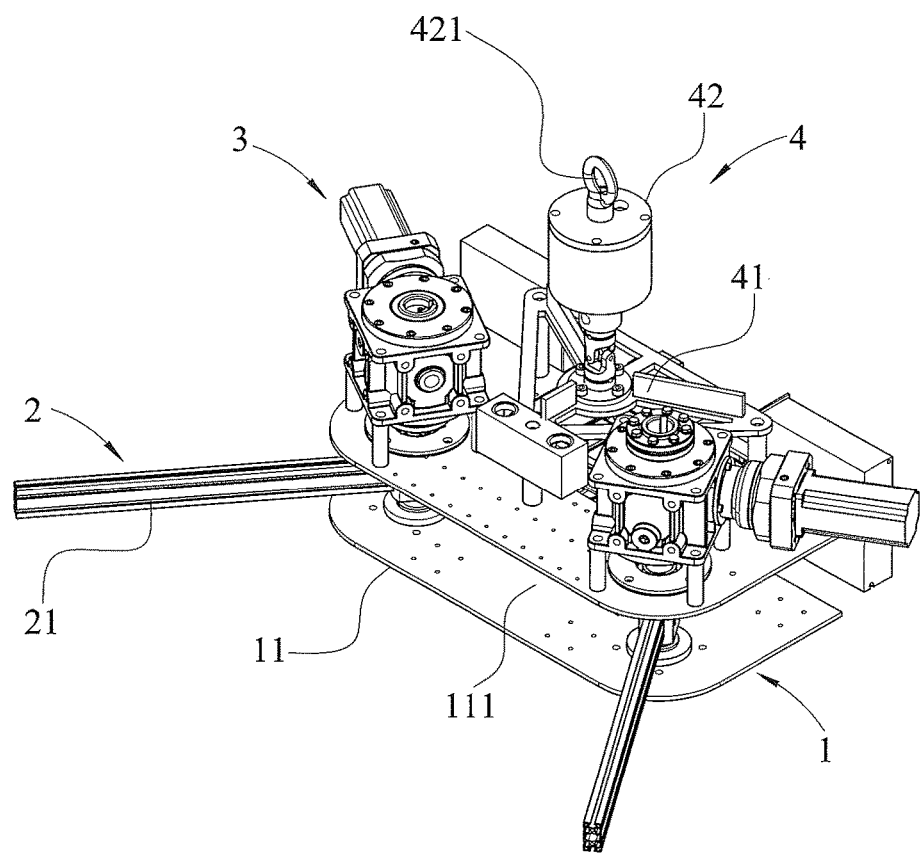
FIG. 1 is a perspective view of a suspension type lifting device in accordance with the preferred embodiment of the present invention.
Figure 2:
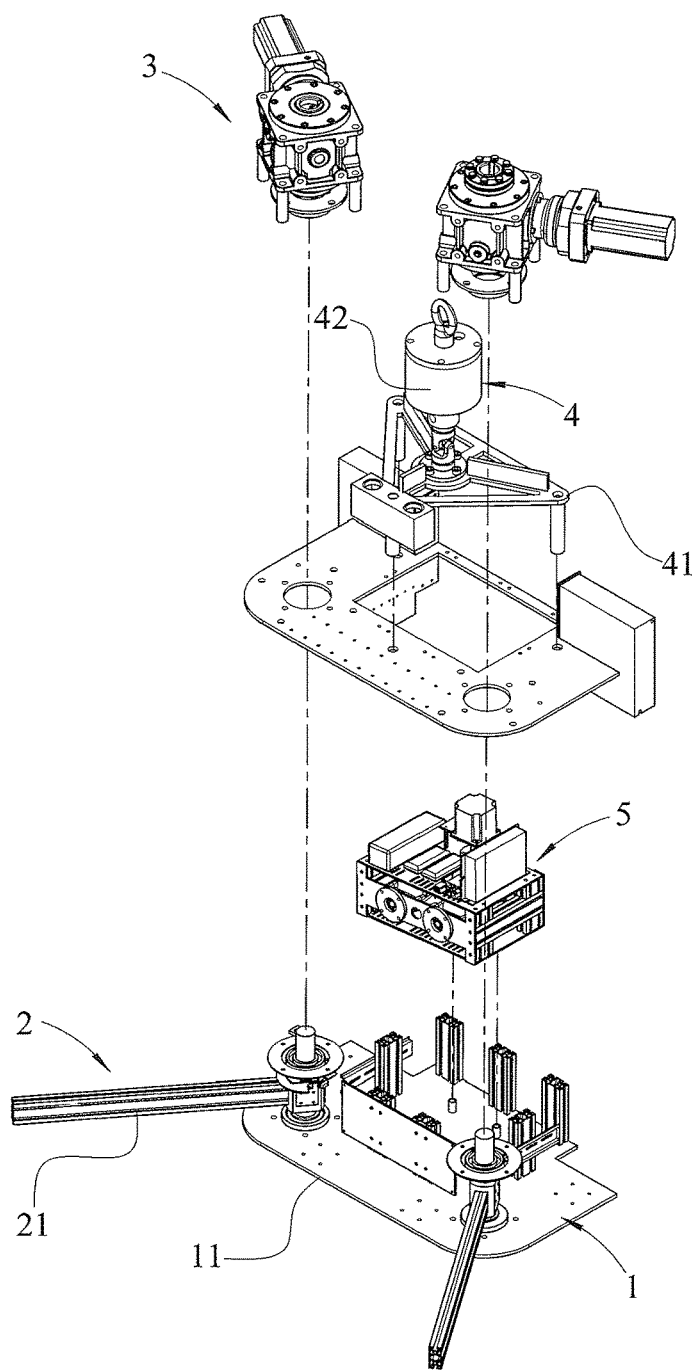
FIG. 2 is an exploded perspective view of the suspension type lifting device in accordance with the preferred embodiment of the present invention.
Figure 3:
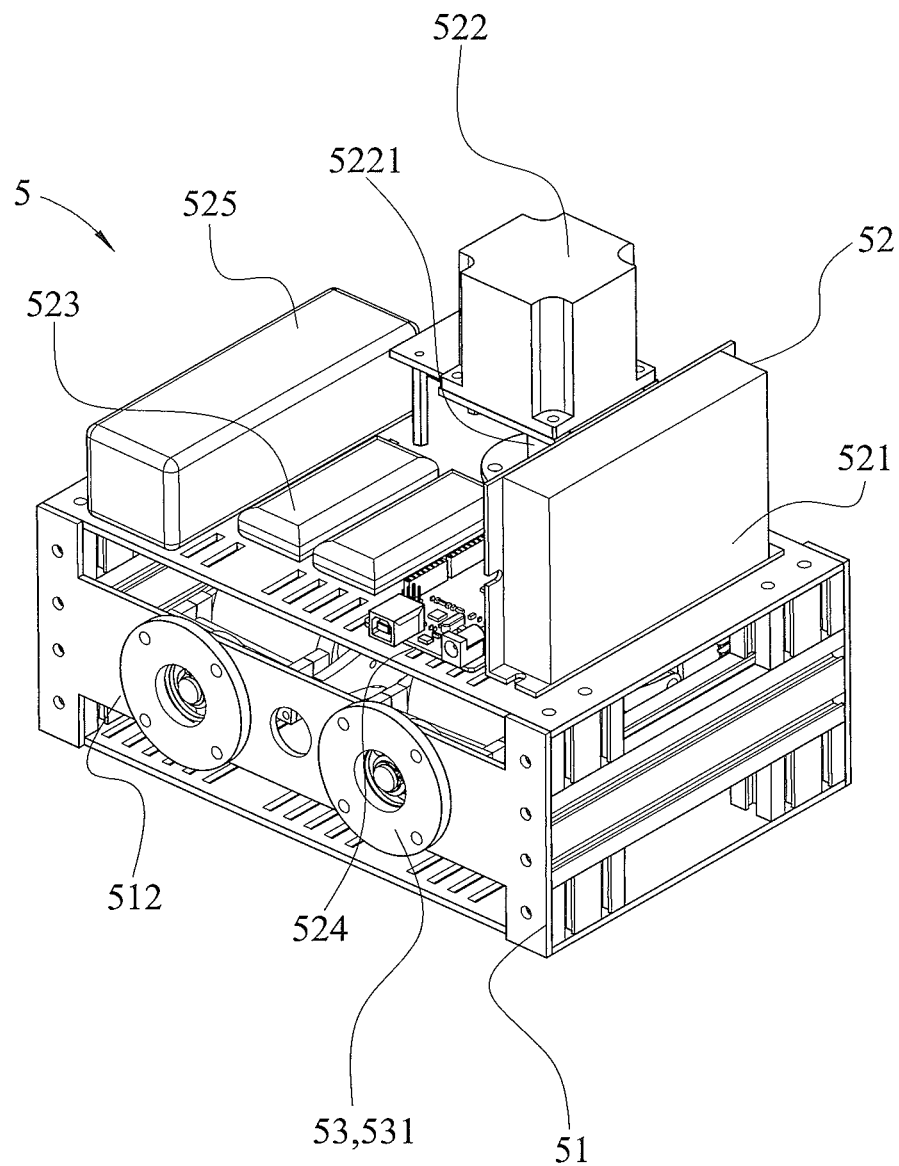
FIG. 3 is a perspective view of a steering unit of the suspension type lifting device in accordance with the preferred embodiment of the present invention.
Figure 4:
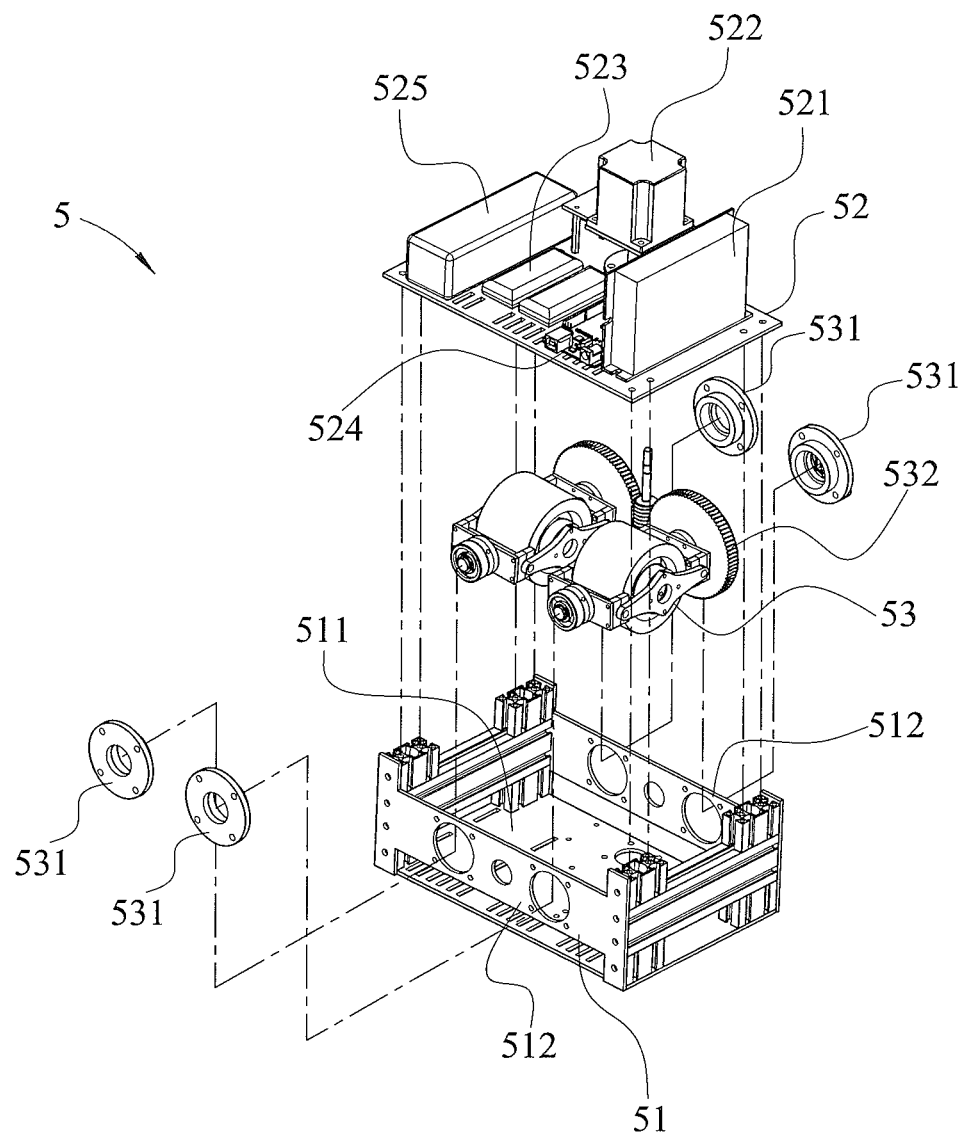
FIG. 4 is an exploded perspective view of the steering unit of the suspension type lifting device in accordance with the preferred embodiment of the present invention.
Figure 5:
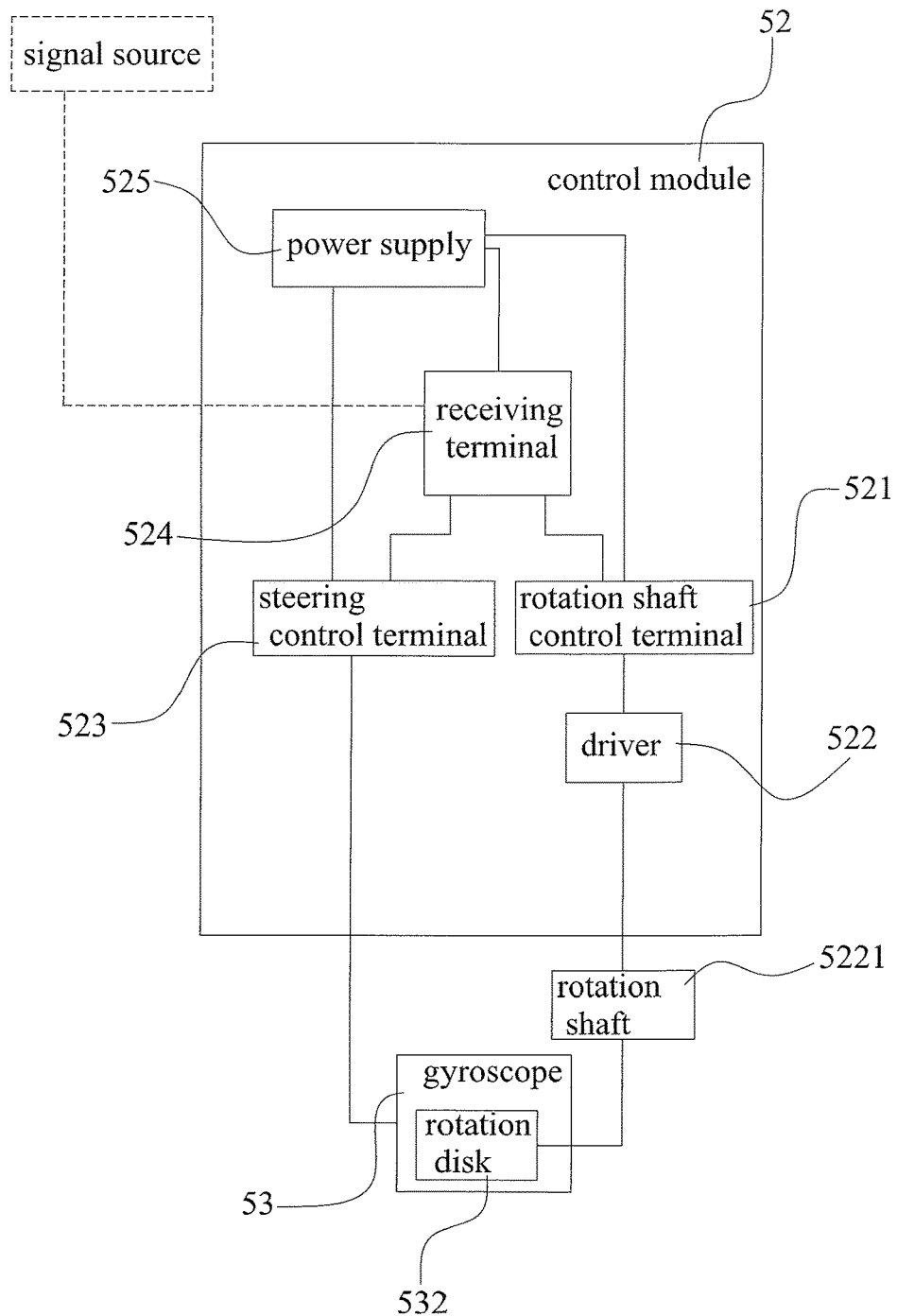
FIG. 5 is a block diagram of a control module of the suspension type lifting device in accordance with the preferred embodiment of the present invention.

Referring to the drawings and initially to FIGS. 1-6, a suspension type lifting device in accordance with the preferred embodiment of the present invention comprises a base unit 1, a balance unit 2 mounted on the base unit 1, two servo units 3 mounted on the base unit 1, a hanging unit 4 mounted on the base unit 1, and a steering unit 5 mounted on the base unit 1.

The base unit 1 includes two support boards 11, with a mounting space 111 being defined between the two support boards 11.

The balance unit 2 includes two weight bars 21 arranged symmetrically to provide a weight balance. Each of the two weight bars 21 has an end mounted in the mounting space 111 of the base unit 1.

The two servo units 3 are connected with the two weight bars 21 of the balance unit 2 respectively to drive the two weight bars 21 of the balance unit 2 to pivot relative to the base unit 1. When the two servo units 3 detect placement of a cargo, the two servo units 3 calculate a value required for reaching a balance weight and transmit a command signal to drive the two weight bars 21 of the balance unit 2 to swing leftward and rightward, so as to reach a balance state.

The hanging unit 4 includes a stand 41 secured on the base unit 1 and a hanging member 42 movably mounted on the stand 41 and having an upper end provided with a hanging hole 421. The hanging member 42 has a lower end provided with a universal ball movably mounted on the stand 41 so that the hanging member 42 has an angle adjustable function. In practice, the hanging unit 4 is hung and moved by a carrier, such as an overhead travelling crane, to carry and move the cargo placed on the lifting device. The lifting device is turned by an external force.

Figure 6:
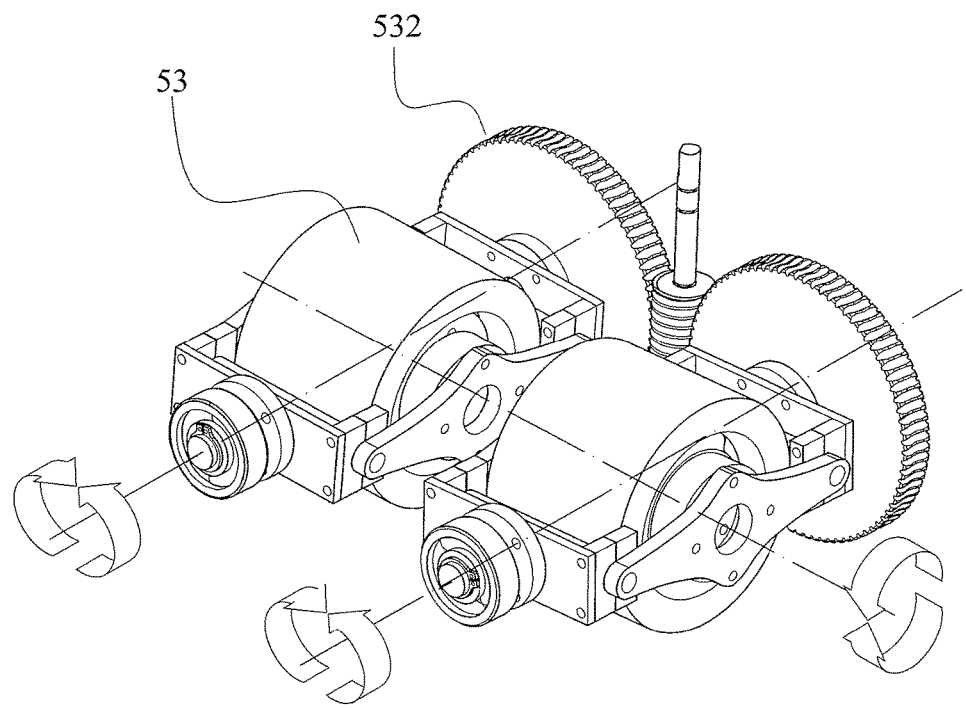
FIG. 6 is a perspective view of two gyroscopes of the suspension type lifting device in accordance with the preferred embodiment of the present invention.

The steering unit 5 is mounted in the mounting space 111 of the base unit 1 and includes a housing 51 secured in the mounting space 111 of the base unit 1 and having an interior provided with a receiving chamber 511, a control module 52 mounted on a top of the housing 51 for receiving a control signal and providing an electric power, and at least one gyroscope 53 rotatably mounted in the receiving chamber 511 of the housing 51 and electrically connected with the control module 52. The receiving chamber 511 of the housing 51 has a front side and a rear side each provided with a mounting zone 512. The at least one gyroscope 53 has a front end and a rear end each provided with a fitting member 531 mounted in the respective mounting zone 512 of the housing 51. The at least one gyroscope 53 performs a self-rotation about an X-axis, and performs a side-rotation about a Y-axis as shown in FIG. 6. The at least one gyroscope 53 performs the side-rotation by the fitting member 531. When the at least one gyroscope 53 performs the side-rotation during the self-rotation, the side-rotation produces a torque to change a direction of the self-rotation and to produce a precession, so as to change a direction of the lifting device. The lifting device is rotated about a Z-axis as shown in FIG. 6.

In the preferred embodiment of the present invention, the at least one gyroscope 53 of the steering unit 5 is a control moment gyroscope (CMG).

In the preferred embodiment of the present invention, the control module 52 of the steering unit 5 includes a rotation shaft control terminal 521, a driver 522 electrically connected with and controlled by the rotation shaft control terminal 521, a rotation shaft 5221 rotated by the driver 522 and extending into the receiving chamber 511 of the housing 51, at least one steering control terminal 523 connected with the at least one gyroscope 53 to regulate the rotation speed of the at least one gyroscope 53, a receiving terminal 524 transmitting the control signal to and controlling operation of the rotation shaft control terminal 521 and the at least one steering control terminal 523, and a power supply 525 electrically connected with the rotation shaft control terminal 521, the at least one steering control terminal 523 and the receiving terminal 524 to provide an electric power. The rotation shaft control terminal 521 controls operation of the driver 522 which drives and rotated the rotation shaft 5221. Preferably, the driver 522 is a servo motor or a step motor.

In the preferred embodiment of the present invention, the at least one gyroscope 53 of the steering unit 5 is electrically connected with the at least one steering control terminal 523 of the control module 52. The at least one gyroscope 53 of the steering unit 5 is controlled by the at least one steering control terminal 523 of the control module 52 to perform the self-rotation. The side-rotation of the at least one gyroscope 53 has a rotation direction perpendicular to that of the self-rotation. The at least one gyroscope 53 of the steering unit 5 is provided with a rotation disk 532 engaging and rotated by the rotation shaft 5221 of the control module 52. The at least one gyroscope 53 of the steering unit 5 is driven by rotation of the rotation disk 532 to perform the side-rotation.

In the preferred embodiment of the present invention, the rotation shaft 5221 of the control module 52 has a rotation direction perpendicular to that of the rotation disk 532 of the at least one gyroscope 53. Preferably, the rotation shaft 5221 of the control module 52 is a threaded rod or bevel gear, and the rotation disk 532 of the at least one gyroscope 53 is a gear or bevel gear. Thus, the rotation shaft 5221 of the control module 52 meshes with the rotation disk 532 of the at least one gyroscope 53.

In the preferred embodiment of the present invention, the steering unit 5 includes two gyroscopes 53 arranged symmetrically. Thus, the two gyroscopes 53 are balanced mutually.

In the preferred embodiment of the present invention, the rotation shaft 5221 of the control module 52 is arranged between and engages the rotation disks 532 of the two gyroscopes 53. Thus, the rotation shaft 5221 of the control module 52 evenly controls the rotation disks 532 of the two gyroscopes 53 so that the rotation disks 532 of the two gyroscopes 53 are rotated steadily.

In the preferred embodiment of the present invention, the receiving terminal 524 of the control module 52 transmits the control signal from a signal source (see FIG. 5) to the rotation shaft control terminal 521 and the at least one steering control terminal 523 in a wire or wireless manner.

In the preferred embodiment of the present invention, the power supply 525 of the control module 52 includes a battery or an external power supply.

Figure 7:
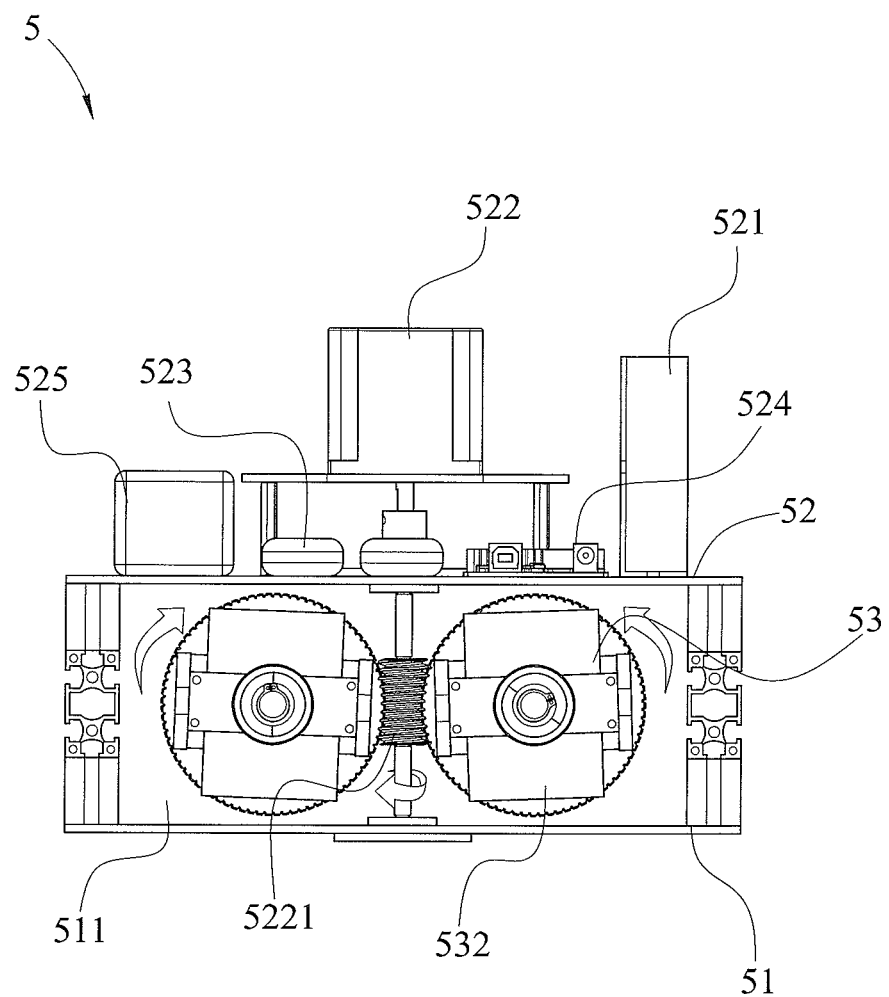
FIG. 7 is a schematic operational view of the steering unit of the suspension type lifting device in accordance with the preferred embodiment of the present invention.
Figure 8:
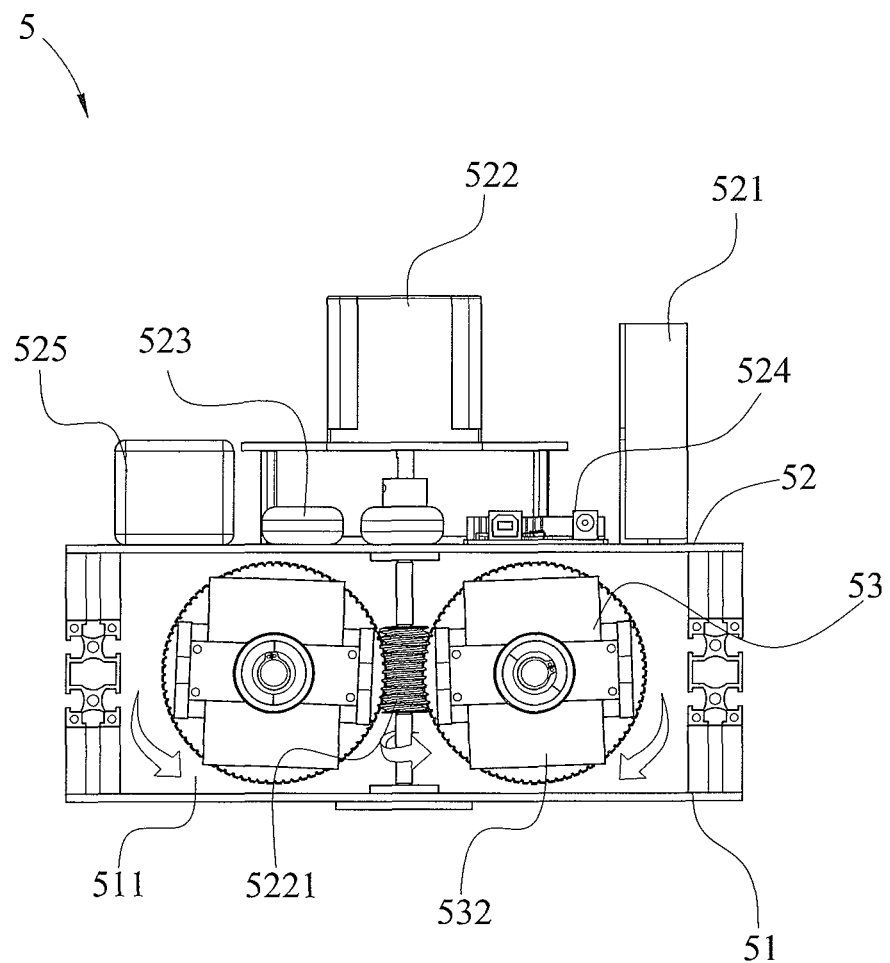
FIG. 8 is another schematic operational view of the steering unit of the suspension type lifting device in accordance with the preferred embodiment of the present invention.
Figure 9:
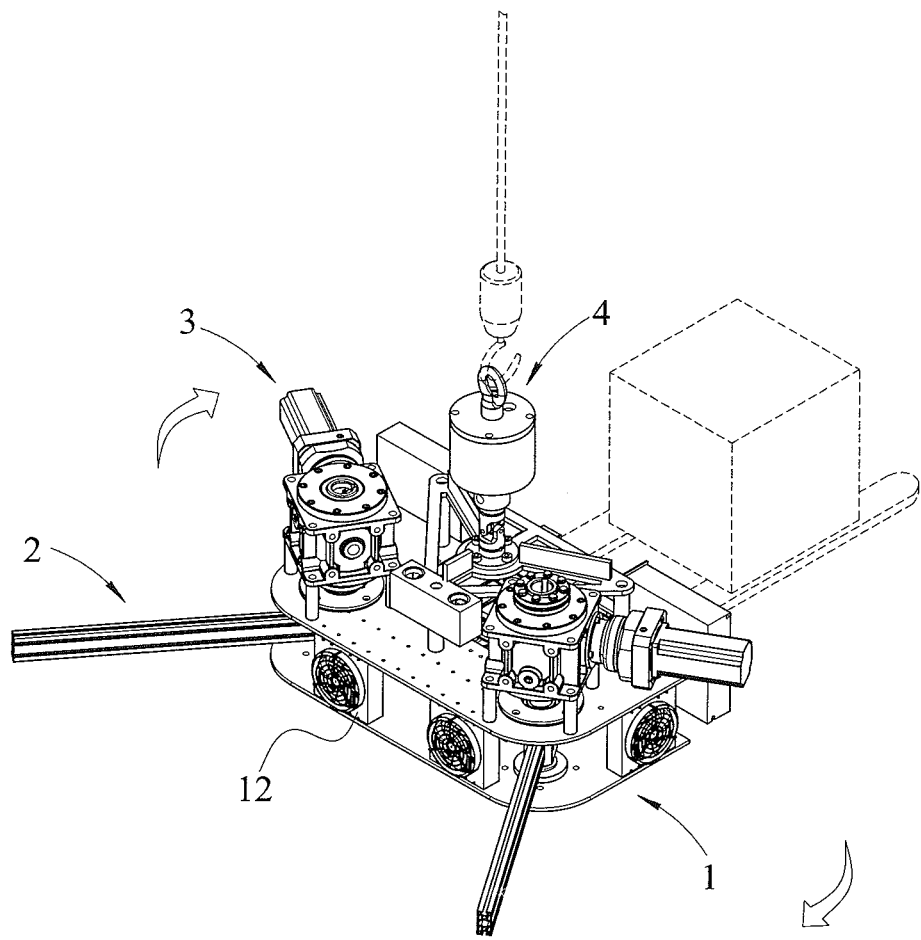
FIG. 9 is a schematic operational view of the suspension type lifting device as shown in FIG. 1 in use.
Figure 10:
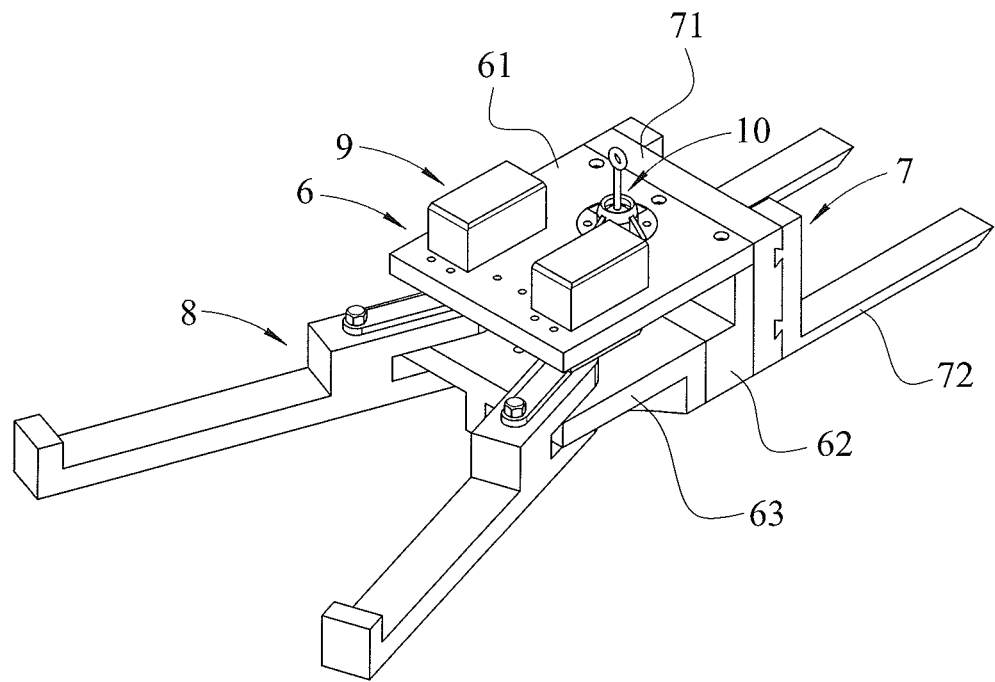
FIG. 10 is a perspective view of a conventional suspension type lifting device in accordance with the prior art.

In operation, referring to FIGS. 6-9 with reference to FIGS. 1-5, the at least one gyroscope 53 initially performs the self-rotation about the X-axis as shown in FIG. 6. When the rotation shaft 5221 of the control module 52 is rotated, the rotation disk 532 of the at least one gyroscope 53 is driven by the rotation shaft 5221 of the control module 52 and is rotated as shown in FIG. 7 or FIG. 8, so that the at least one gyroscope 53 performs the side-rotation about the Y-axis as shown in FIG. 6. In such a manner, when the at least one gyroscope 53 performs the self-rotation and the side-rotation simultaneously, the side-rotation of the at least one gyroscope 53 produces a torque to change the direction of the self-rotation and to produce a precession, so as to change the direction of the lifting device. The lifting device is rotated about the Z-axis. Thus, the direction of the lifting device is changed as shown in FIG. 9 by rotation of the at least one gyroscope 53.

It is appreciated that, the at least one gyroscope 53 is not only used to provide a steering function. In addition, the at least one gyroscope 53 aids the two weight bars 21 of the balance unit 2 to maintain the balance effect, so that the lifting device is operated steadily and will reduce deflection or vibration during displacement.

As shown in FIG. 9, the base unit 1 further includes at least one auxiliary fan 12 blowing air outward to produce a kinetic energy to aid the turning motion of the lifting device.

Accordingly, the at least one gyroscope 53 controls the turning direction and stabilizes the center of gravity of the lifting device, so that the lifting device has a steering function by rotation of the at least one gyroscope 53, without needing aid of an external force, thereby facilitating the lifting device changing its direction.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A suspension lifting device comprising:
a base unit;
a balance unit mounted on the base unit;
two servo units mounted on the base unit;
a hanging unit mounted on the base unit; and
a steering unit mounted on the base unit;
wherein:
the base unit includes two support boards, with a mounting space being defined between the two support boards;
the balance unit includes two weight bars each of which has an end mounted in the mounting space of the base unit;
the two servo units are connected with the two weight bars of the balance unit respectively;
the hanging unit includes a stand secured on the base unit and a hanging member movably mounted on the stand and having an upper end provided with a hanging hole;
the steering unit is mounted in the mounting space of the base unit and includes:
a housing secured in the mounting space of the base unit and having an interior provided with a receiving chamber;
a control module mounted on the housing for receiving a control signal and providing an electric power; and
at least one gyroscope rotatably mounted in the receiving chamber of the housing and electrically connected with the control module;
the receiving chamber of the housing has a front side and a rear side each provided with a mounting zone;
the at least one gyroscope has a front end and a rear end each provided with a fitting member mounted in the respective mounting zone of the housing;
the at least one gyroscope performs a self-rotation by the control module and performs a side-rotation by the fitting member; and
when the at least one gyroscope performs the self-rotation and the side-rotation simultaneously, the side-rotation produces a torque to change a direction of the self-rotation and to produce a precession, so as to change a direction of the lifting device.

2. The suspension lifting device of claim 1, wherein the at least one gyroscope of the steering unit is a control moment gyroscope (CMG).

3. The suspension lifting device of claim 1, wherein the control module of the steering unit includes:
a rotation shaft control terminal;
a driver electrically connected with and controlled by the rotation shaft control terminal;
a rotation shaft rotated by the driver and extending into the receiving chamber of the housing;
at least one steering control terminal connected with the at least one gyroscope;
a receiving terminal transmitting the control signal to and controlling operation of the rotation shaft control terminal and the at least one steering control terminal; and
a power supply electrically connected with the rotation shaft control terminal, the at least one steering control terminal and the receiving terminal to provide an electric power.

4. The suspension lifting device of claim 3, wherein:
the at least one gyroscope of the steering unit is electrically connected with the at least one steering control terminal of the control module;
the at least one gyroscope of the steering unit is controlled by the at least one steering control terminal of the control module to perform the self-rotation;
the side-rotation of the at least one gyroscope has a rotation direction perpendicular to that of the self-rotation;
the at least one gyroscope of the steering unit is provided with a rotation disk engaging and rotated by the rotation shaft of the control module; and
the at least one gyroscope of the steering unit is driven by rotation of the rotation disk to perform the side-rotation.

5. The suspension lifting device of claim 4, wherein:
the rotation shaft of the control module has a rotation direction perpendicular to that of the rotation disk of the at least one gyroscope;
the rotation shaft of the control module is a threaded rod or bevel gear;
the rotation disk of the at least one gyroscope is a gear or bevel gear; and
the rotation shaft of the control module meshes with the rotation disk of the at least one gyroscope.

6. The suspension lifting device of claim 3, wherein the receiving terminal of the control module transmits the control signal from a signal source to the rotation shaft control terminal and the at least one steering control terminal in a wire or wireless manner.

7. The suspension lifting device of claim 3, wherein the power supply of the control module includes a battery or an external power supply.

8. The suspension lifting device of claim 1, wherein the steering unit includes two gyroscopes arranged symmetrically.

9. The suspension lifting device of claim 8, wherein the rotation shaft of the control module is arranged between and engages the rotation disks of the two gyroscopes.

10. The suspension lifting device of claim 1, wherein the base unit further includes at least one auxiliary fan.

* * * * *